US008887564B2

(12) United States Patent
Harrison

(10) Patent No.: US 8,887,564 B2
(45) Date of Patent: Nov. 18, 2014

(54) METHOD FOR PREDICTING INITIAL UNBALANCE IN A COMPONENT

(75) Inventor: John M. Harrison, Bristol (GB)

(73) Assignee: Rolls-Royce PLC, London (GB)

(*) Notice: Subject to any disclaimer, the term of this patent is extended or adjusted under 35 U.S.C. 154(b) by 791 days.

(21) Appl. No.: 13/160,748

(22) Filed: Jun. 15, 2011

(65) Prior Publication Data

US 2011/0314909 A1 Dec. 29, 2011

(30) Foreign Application Priority Data

Jun. 28, 2010 (GB) .................................. 1010757.1

(51) Int. Cl.
*G01M 1/00* (2006.01)
*F01D 5/02* (2006.01)
*F16F 15/32* (2006.01)
*G01M 1/30* (2006.01)
*G01M 1/36* (2006.01)

(52) U.S. Cl.
CPC .............. *F01D 5/027* (2013.01); *F16F 15/32* (2013.01); *G01M 1/30* (2013.01); *G01M 1/36* (2013.01); *Y02T 50/671* (2013.01)
USPC ....................................................... 73/455

(58) Field of Classification Search
CPC .......... F01D 5/027; F16F 15/32; G01M 1/30; G01M 1/36
USPC ...................................... 73/66, 455
See application file for complete search history.

(56) References Cited

U.S. PATENT DOCUMENTS

| 4,835,827 | A  | * | 6/1989  | Marra .......................... 29/889.2 |
| 4,836,755 | A  | * | 6/1989  | Nitsche et al. ................ 417/368 |
| 5,582,077 | A  | * | 12/1996 | Agram et al. ................. 464/180 |
| 6,354,780 | B1 | * | 3/2002  | Davis et al. ................... 414/146 |
| 6,584,849 | B2 | * | 7/2003  | Loftus et al. .................... 73/659 |
| 6,792,660 | B1 |   | 9/2004  | Breese |
| 7,069,654 | B2 | * | 7/2006  | Robbins ..................... 29/889.23 |
| 7,082,371 | B2 | * | 7/2006  | Griffin et al. ................... 702/56 |
| 7,206,709 | B2 | * | 4/2007  | Griffin et al. ................... 702/85 |
| 7,383,136 | B1 | * | 6/2008  | Griffin et al. ................... 702/56 |
| 7,553,125 | B2 | * | 6/2009  | Audic et al. .................. 415/118 |
| 8,171,632 | B2 | * | 5/2012  | Kuehhorn et al. .......... 29/889.23 |
| 8,313,279 | B2 | * | 11/2012 | Mollmann ........................ 415/1 |

(Continued)

FOREIGN PATENT DOCUMENTS

| EP | 1 188 900 A2 | 3/2002 | |
| EP | 1188900 A2 * | 3/2002 | ................ F01D 5/02 |

(Continued)

OTHER PUBLICATIONS

Ishida Ikuo et al. (English Translation of Japanese Patent Application Publication JP 2003-323468).*

(Continued)

*Primary Examiner* — Peter Macchiarolo
*Assistant Examiner* — Samir M Shah
(74) *Attorney, Agent, or Firm* — Oliff PLC

(57) ABSTRACT

A method for predicting initial unbalance in a component comprising one or more elements, the method comprising: defining a statistical distribution of a mass moment weight of each of the one or more elements; restricting the statistical distribution to a selected range; and calculating an initial unbalance of the component for the restricted distribution of the one or more elements.

11 Claims, 3 Drawing Sheets

(56) References Cited

U.S. PATENT DOCUMENTS

| | | | |
|---|---|---|---|
| 8,316,523 B2* | 11/2012 | Durocher et al. | 29/445 |
| 8,328,519 B2* | 12/2012 | Denis et al. | 416/144 |
| 8,342,804 B2* | 1/2013 | Pronovost et al. | 416/144 |
| 8,505,384 B2* | 8/2013 | Lomenzo | 73/655 |
| 8,543,341 B2* | 9/2013 | Rajagopalan et al. | 702/34 |
| 8,578,584 B2* | 11/2013 | Durocher et al. | 29/445 |
| 8,589,131 B2* | 11/2013 | Gonzalez Cuadrado | 703/7 |
| 8,676,514 B2* | 3/2014 | Rajagopalan et al. | 702/34 |
| 2004/0003678 A1* | 1/2004 | Neubauer et al. | 74/573 R |
| 2005/0273302 A1 | 12/2005 | Huang et al. | |
| 2005/0274179 A1 | 12/2005 | Douglas | |
| 2008/0245138 A1 | 10/2008 | Lucas et al. | |

FOREIGN PATENT DOCUMENTS

| | | |
|---|---|---|
| EP | 2 014 869 A1 | 1/2009 |
| JP | A-10-281913 | 10/1998 |
| JP | A-2003-323468 | 11/2003 |
| JP | A-2003-323469 | 11/2003 |

OTHER PUBLICATIONS

British Search Report issued in British Application No. GB1010757.1 on Jul. 30, 2010.

European Search Report issued in European Application No. 11 16 9966 on Oct. 27, 2011.

* cited by examiner

METHOD FOR PREDICTING INITIAL UNBALANCE IN A COMPONENT

The present invention relates to a method for predicting initial unbalance in a component and particularly, but not exclusively, to a method which allows the weight of the component to be reduced.

BACKGROUND

Mass unbalance in rotating components such as wheels, crankshafts, gas turbine engine rotors, etc. can cause undesirable vibration. Such vibration may cause damage to the component and the surrounding structure. Mass unbalance may be corrected by redistributing the mass of the component so as to position the centre of mass at the axis of rotation.

The effects of unbalance become more pronounced at higher rotational speeds. Consequently, unbalance is a particular issue in the aerospace industry where components rotate at extremely high speeds. Furthermore, vibration levels in an aerospace gas turbine engine are not only important from an engine reliability viewpoint but also from a passenger comfort viewpoint.

An unbalanced component exerts a force on its bearings which is given by:

$$F = Mr\omega^2$$

where M is the mass of the rotating component; r is the radial offset of the mass from its centre of mass; and $\omega$ is the angular velocity.

For a gas turbine engine, the mass of the rotor is relatively high and the angular velocity is extremely high. Therefore, it can be seen that any radial offset of the mass from its centre of mass (i.e. unbalance) results in a large force being exerted on the bearings. Consequently, it is necessary to minimise the radial offset.

Typically a Balance Grade of G2 (ISO 1940-1) may be imposed on gas turbine engines. For a rotor rotating at 10000 rpm, this equates to a permissible mass offset of 2 µm. This tolerance is some 200 times more stringent than those applied to everyday applications, such as car wheel balancing (Balance Grade G40).

Gas turbine engine rotors are conventionally balanced using the weight variation present in a set of aerofoil blades. The blades are detachably mounted to a disc of the rotor via slots provided around the circumference of the disc. The location of the blades around the rotor's disc can be varied to correct not only the disc unbalance but also that of the set of blades, thus producing a balanced rotor. With this method, the blades are weighed, or moment weighed and then distributed around the disc in a pattern to either minimise the unbalance in the blade set, or to compensate for the unbalance in the assembly.

In contrast, a blisk comprises a disc with integrally formed blades. This provides a considerable weight saving over the above described rotor by removing the fixtures required to detachably mount the blades to the disc. A reduction in mass of between 20% and 60% can be achieved by using a blisk. The reduction in weight provides an increase in the thrust to weight ratio, which leads to increased fuel economy and associated reduction in running costs, or to an increased payload for the aircraft. As a result, blisks are becoming more prevalent. However, blisks are very complex and time consuming to produce, and consequently, the cost per component is very high. Owing to the complexity of the manufacturing process, there is significant potential for non-conformance in the finished component, and the cost of rejection will again be very high. Furthermore, it is not possible to balance a blisk by interchanging blades and therefore it is necessary to correct the balance of the blisk using alternative methods.

One method of balancing a blisk is to bolt balancing weights onto the blisk to adjust its balance. However, adding weights to balance a blisk is counterproductive since the purpose of a blisk is to save weight. Furthermore, the weights increase the centrifugal loading on the blisk and can only be located in low stress areas. In addition, the connection between the weight and the blisk provides an interface where vibration may occur. This can lead to fretting and erosion. Also, the weights present a potential cause of Domestic Object Damage (DOD) to the engine, if the connection between a weight and the blisk fails.

An alternative method uses sacrificial balancing lands which are specifically provided on the component. These balancing lands may be machined to remove some or all of their mass and thus adjust the balance of the component. Such balancing methods require the provision of balancing lands or other features which can be later removed, if required. This results in the component being heavier than would otherwise be necessary.

Conventionally, the required size of the sacrificial balancing lands is calculated based on a worst case scenario for the distribution of the blades. This is where a 180 degree arc of maximum mass blades is located opposite a 180 degree arc of minimum mass blades. Although this ensures that all of the blisks produced can be balanced, the size of the balancing lands is excessive and counteracts the weight saving associated with a blisk.

The present invention seeks to provide a method for predicting initial unbalance in a blisk which provides a value of maximum probable unbalance rather than maximum possible unbalance, as is the case with the prior art method.

STATEMENTS OF INVENTION

In accordance with an aspect of the invention there is provided a method for predicting initial unbalance in a component comprising one or more elements, the method comprising: defining a statistical distribution of a mass moment weight of each of the one or more elements; restricting the statistical distribution to a selected range; and calculating an initial unbalance of the component for the restricted distribution of the one or more elements.

The method may further comprise providing the component with a balance correction feature of suitable size to correct a maximum unbalance of the restricted distribution.

The selected range may indicate the probability of obtaining a component which cannot be balanced using the balance correction feature.

The component may be a bladed disk or ring and the elements may be a set of aerofoil components. The method may further comprise selecting a plurality of sets of aerofoil components from the statistical distribution and allocating a location for each aerofoil component on the bladed disk or ring, wherein each set of aerofoil components forms a sample distribution; calculating a vector sum of the mass moment weights for each sample distribution to determine the initial unbalance of the blisk.

The method may be repeated for every permutation of the mass moment weight and/or location of each aerofoil component.

The statistical distribution may include a tool wear characteristic.

The tool wear characteristic may be based on the manufacturing process of the component.

The tool wear characteristic may define an increase in the mass of the aerofoil components around the circumference of the bladed disk or ring.

The statistical distribution may be a normal distribution.

The normal distribution may have a maximum variation of ±8% from an expected value of the mass moment weight.

The selected range may be ±3 standard deviations from an expected value of the mass moment weight.

The mass moment weight may include one or more of a radial, axial or tangential component.

The initial unbalance may be calculated using a Monte Carlo simulation.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

In an embodiment of the present invention, a prediction of the initial unbalance in a blisk is made using a statistical approach to provide a more realistic reflection of probable unbalance.

Firstly, it is assumed that each blade used to form the blisk has a mass moment weight which is selected from a normal distribution centred on the expected mass of the blades. However, to remove the most extreme situations, i.e. the maximum possible unbalance described previously, the blades are assumed to have a maximum variation of ±8% from the expected mass. The selected distribution equates to ±3 standard deviations ($\sigma$) and thus includes 99.7% of blades.

Figure 1:
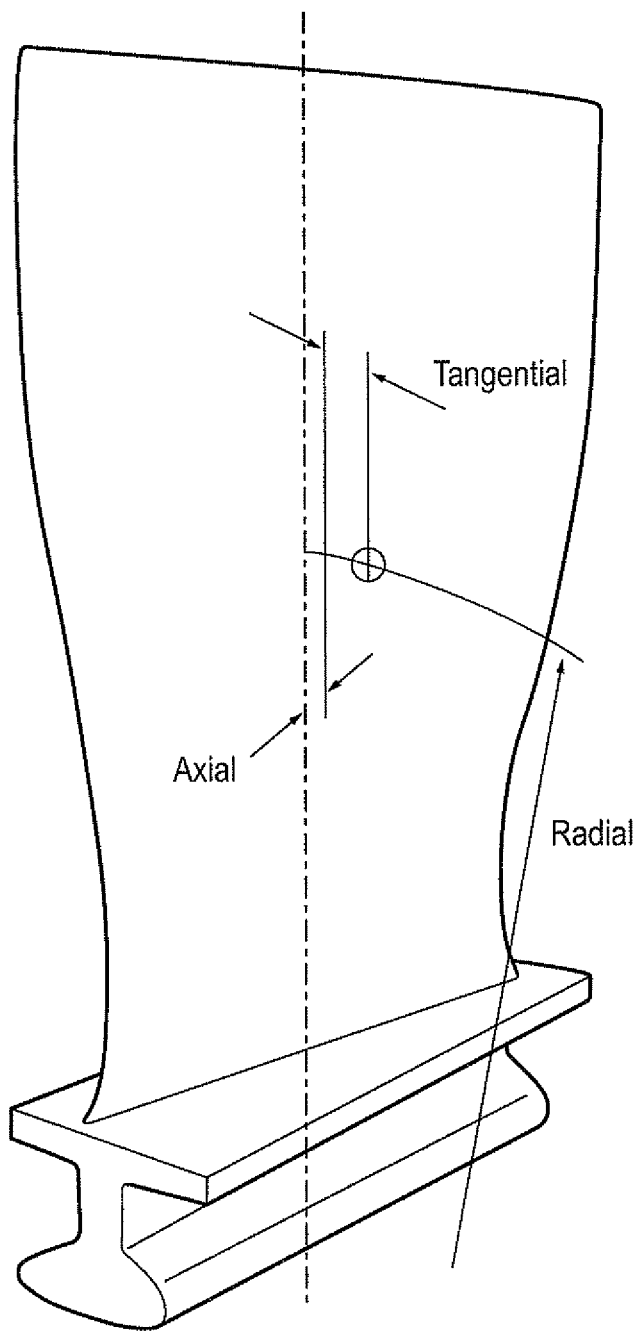
FIG. 1 is a perspective view of a blade showing the components of its mass moment.

The normal distribution of the mass moment weights may be a radial, tangential or axial component of the mass moment, as shown in FIG. 1.

A simulated blisk is formed by selecting a plurality of blades from the distribution and locating the blades at the blade positions around the blisk. The unbalance effect of each blade is calculated by multiplying the mass of the blade by the radius to the centre of mass of the blade. From this, a vector sum of the unbalances of each blade is calculated so as to determine the resulting unbalance for the blisk.

This process is repeated for every positional permutation of the selected blades and is again repeated for many sets of blades selected from the distribution, or vice-versa, such that a distribution of the blisk unbalance is created.

The distribution of the blisk unbalance can be calculated using a Monte Carlo simulation, where the blades are modelled as individual normal distributions positioned around the blisk. However, other statistical methods may be used to calculate the distribution of the blisk unbalance.

The distribution of the blisk unbalance shows the maximum unbalance for the selected distribution. From this value, one or more balance correction features, such as sacrificial balancing lands, can be provided on the blisk which allows the maximum unbalance to be corrected. This ensures that all blisks within the selected distribution can be successfully balanced.

The selected distribution also shows how many blisks are expected to fall outside the defined maximum unbalance and thus can not be balanced using the sacrificial balancing land. These blisks will be rejected and thus the selected distribution provides a measure of the risk in reducing the size of the sacrificial balancing land. For example, where the selected distribution is ±3 standard deviations ($\sigma$), it can be expected that 1 in every 370 blisks manufactured will fall outside of the range.

Having excluded the most extreme situations, the size of the balancing lands required to balance the blisk are dramatically reduced with only a slight increase in the rejection rate of components.

The invention has been used on blisks of varying geometry and it has been observed that the ratio of the maximum possible unbalance to the maximum acquired with the present invention varies depending on the relative sizes of the blades and disc. For example, a larger number of smaller sized blades on a large diameter disc generates a higher ratio than a small number of large blades on a smaller disc.

The present invention has been shown to provide a reduction in the size of the balance correction feature of between 65% and 83% compared to the prior art method. This saves significant weight and thus improves the thrust to weight ratio, which leads to increased fuel economy and associated reduction in running costs, or to an increased payload for the aircraft.

In an alternative embodiment, the selection of the range of blade masses may be applied to the distribution of the blisk unbalance. Furthermore, the range of values included may be any selected range, with the selected range being chosen with regard to the associated rejection rate.

Figure 2:
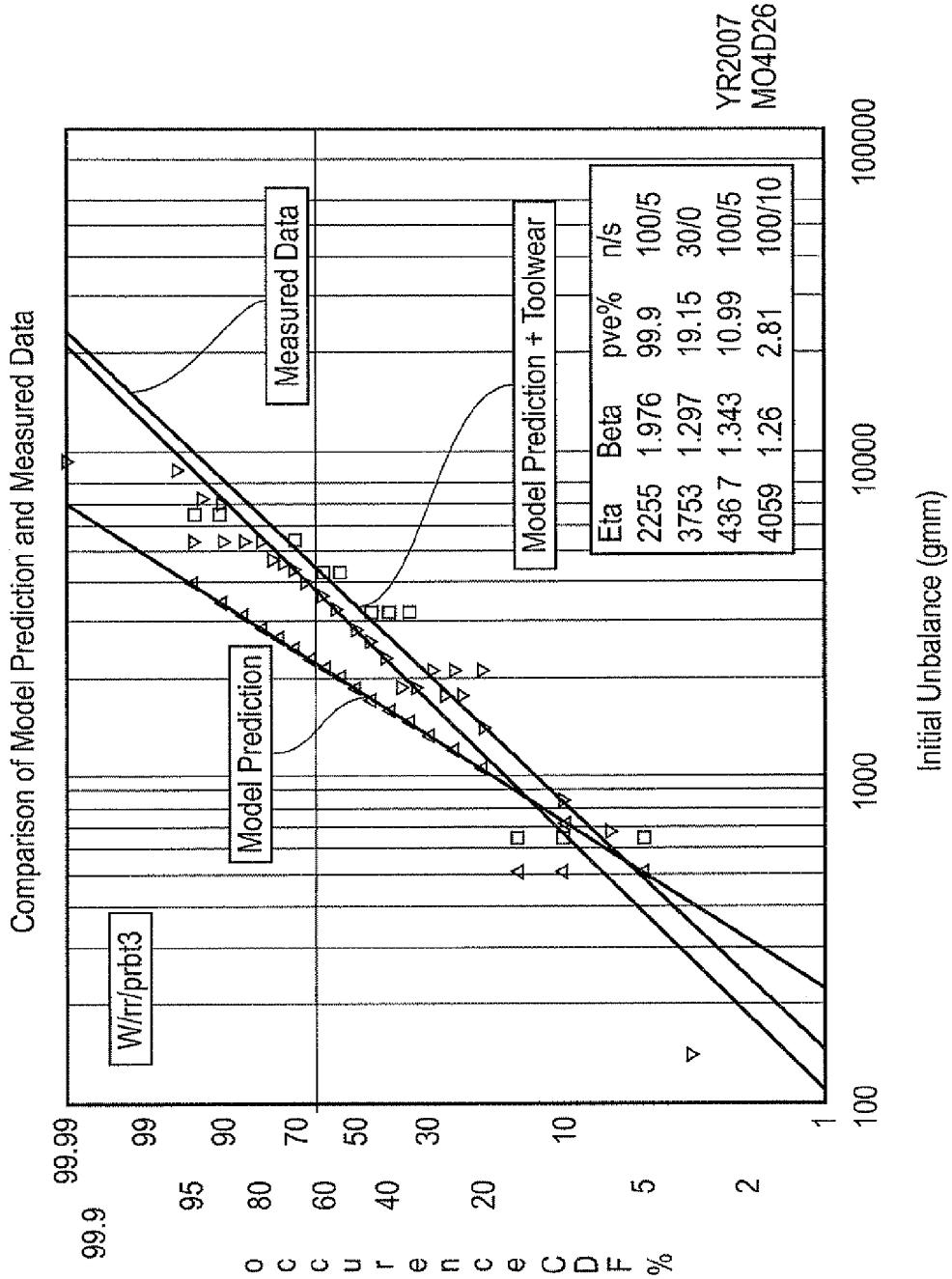
FIG. 2 is a Weibull plot showing the correlation between unbalance values predicted using the invention and measured data.

FIG. 2 shows a Weibull plot of the predicted unbalance ("Model Prediction") and measured unbalance ("Measured Data") from a sample of manufactured blisks.

The Weibull plot shows the distributions (i.e. the initial unbalance and cumulative density function of the occurrence of the initial unbalances) on a log-log scale, and expresses each distribution with a positional parameter ($\eta$) and a measure of spread of the data ($\beta$). The spread of the data ($\beta$) corresponds to the slope of the line in FIG. 2 and thus it can be seen that the value of $\beta$ for the predicted unbalance does not correspond to that of the measured unbalance.

Figure 3:
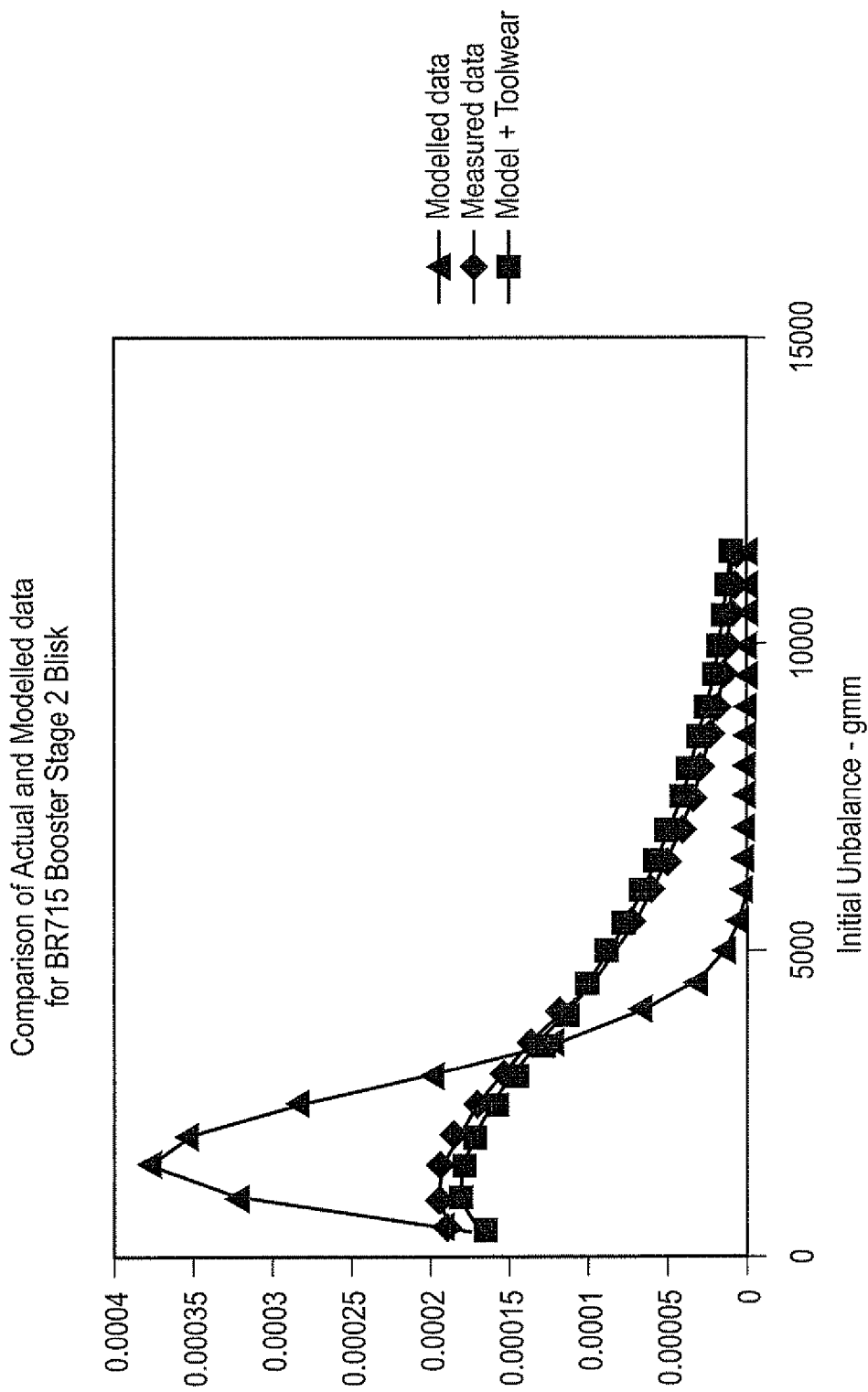
FIG. 3 is a Weibull probability density function plot of the predicted unbalance using the invention and measured data.

This can also be seen in FIG. 3, which shows the Weibull probability density function plot of the predicted unbalance ("Modelled data") and the measured unbalance from the sample of manufactured blisks ("Measured data").

In another embodiment of the invention, a tool wear characteristic is included in the distribution of the mass moment weights of the blades.

The tool wear characteristic is based on the manufacturing process used to make the blisk. In the present case, the blisk is machined from solid using the same cutter for all of the blades. Therefore, as the cutter becomes worn during the manufacturing process, the blades become slightly larger and thus heavier. Furthermore, the cutting forces become larger as the cutter becomes worn, causing the blade to push-off during machining and thus resulting in a heavier blade. Consequently, the tool wear generates a circumferential variation in the mass moment of the aerofoils and hence an associated unbalance.

In order to incorporate a tool wear characteristic, an estimate is made of the effect of the worn tool on the blade mass. Here, the mass is assumed to increase linearly around the circumference of the blisk in the sequence of blade manufacture. However, other corrections may be applied depending on the manufacturing process.

FIGS. 2 and 3 also show the predicted unbalance including this tool wear characteristic ("Model Prediction+Toolwear"). As shown, the predicted unbalance including the tool wear characteristic provides a very close correlation with the measured distribution data.

Accordingly, the predicted unbalance ("Model Prediction") is considered suitable where the manufacturing process does not bias the unbalance within the brisk.

Although the invention has been described with reference to a blisk, it could also be applied to a bladed ring (bling) or other rotating component.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A method for predicting an initial unbalance in a bladed disc or ring including one or more aerofoil components, the method comprising:
    defining, with a processor, a statistical distribution of a mass moment weight of each of the one or more aerofoil components;
    restricting, with the processor, the statistical distribution to a selected range of mass moment weight for each of the one or more aerofoil components, the selected range indicating a probability of obtaining a bladed disc or ring which cannot be balanced using a balance correction feature;
    selecting, with the processor, a plurality of sets of aerofoil components from the statistical distribution and allocating a location for each aerofoil component on the bladed disk or ring, wherein each set of aerofoil components forms a sample distribution;
    calculating, with the processor, a vector sum of the mass moment weights for each sample distribution to determine the initial unbalance of the bladed disc or ring for the selected range of mass moment weight for each of the one or more aerofoil components; and
    providing the bladed disc or ring with the balance correction feature, the balance correction feature having a suitable size to correct a maximum unbalance of the restricted distribution.

2. The method as claimed in claim 1, wherein the method is repeated for every permutation of the mass moment weight and/or location of each of the one or more aerofoil components.

3. The method as claimed in claim 1, wherein the statistical distribution includes a tool wear characteristic.

4. The method as claimed in claim 3, wherein the tool wear characteristic is based on a manufacturing process of the bladed disc or ring.

5. The method as claimed in claim 4, wherein the tool wear characteristic defines an increase in the mass of the aerofoil components around a circumference of the bladed disc or ring.

6. The method as claimed in claim 3, wherein the tool wear characteristic defines an increase in the mass of the aerofoil components around a circumference of the bladed disc or ring.

7. The method as claimed in claim 1, wherein the statistical distribution is a normal distribution.

8. The method as claimed in claim 1, wherein the statistical distribution is a normal distribution that has a maximum variation of ±8% from an expected value of the mass moment weight.

9. The method as claimed in claim 1, wherein the selected range is ±3 standard deviations from an expected value of the mass moment weight.

10. The method as claimed in claim 1, wherein the mass moment weight includes one or more of a radial, axial or tangential component.

11. The method as claimed in claim 1, wherein the initial unbalance is calculated using a Monte Carlo simulation.

* * * * *